(12) United States Patent
Ruckle et al.

(10) Patent No.: US 6,684,961 B2
(45) Date of Patent: Feb. 3, 2004

(54) PITCH ADJUSTMENT FOR A TILLAGE SHANK ASSEMBLY

(75) Inventors: Jarrod Ray Ruckle, Bondurant, IA (US); Garrett Lee Goins, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/137,544

(22) Filed: May 2, 2002

(65) Prior Publication Data

US 2003/0205392 A1 Nov. 6, 2003

(51) Int. Cl.[7] ................................................ A01B 61/04
(52) U.S. Cl. .................................... 172/265; 172/705
(58) Field of Search ................................. 172/705, 265, 172/264, 263, 262, 261, 707, 708, 709, 710, 711, 500, 497; 111/151; 267/177, 174; 254/10.5

(56) References Cited

U.S. PATENT DOCUMENTS

| 1,524,369 | A | | 5/1925 | Ramage |
| 3,402,773 | A | | 9/1968 | Jennings, et al. |
| 3,700,039 | A | | 10/1972 | Essex et al. ................. 172/265 |
| 3,760,882 | A | | 9/1973 | Geurts ........................ 172/265 |
| 4,800,964 | A | | 1/1989 | Rettig et al. ................. 172/711 |
| 5,695,012 | A | | 12/1997 | Kesting ....................... 172/699 |
| 5,724,903 | A | * | 3/1998 | Yoder et al. ............. 172/265 X |
| 6,065,548 | A | | 5/2000 | Zaun et al. .................. 172/265 |
| 6,250,397 | B1 | | 6/2001 | Hook et al. .................. 172/265 |
| 6,250,398 | B1 | | 6/2001 | Zaun et al. .................. 172/710 |

FOREIGN PATENT DOCUMENTS

DE    199 56 953 A1    6/2000

\* cited by examiner

*Primary Examiner*—Christopher J. Novosad

(57) ABSTRACT

A spring trip shank assembly with a fixed downstop includes a pivot area with an eccentric mechanism for varying the location of the shank pivot relative to the downstop so that shank position and tool pitch can be adjusted without need to change downstop location. A bushing with an eccentric bore and a keyway receives a threaded bolt with a mating key. A captive nut fastens the assembly in position for the desired shank pitch. Marks located on the mounting bracket and on the bolt head provide an easily readable indication of the selected pivot location so a plurality of the assemblies can be adjusted to the same pitch quickly and easily.

14 Claims, 2 Drawing Sheets

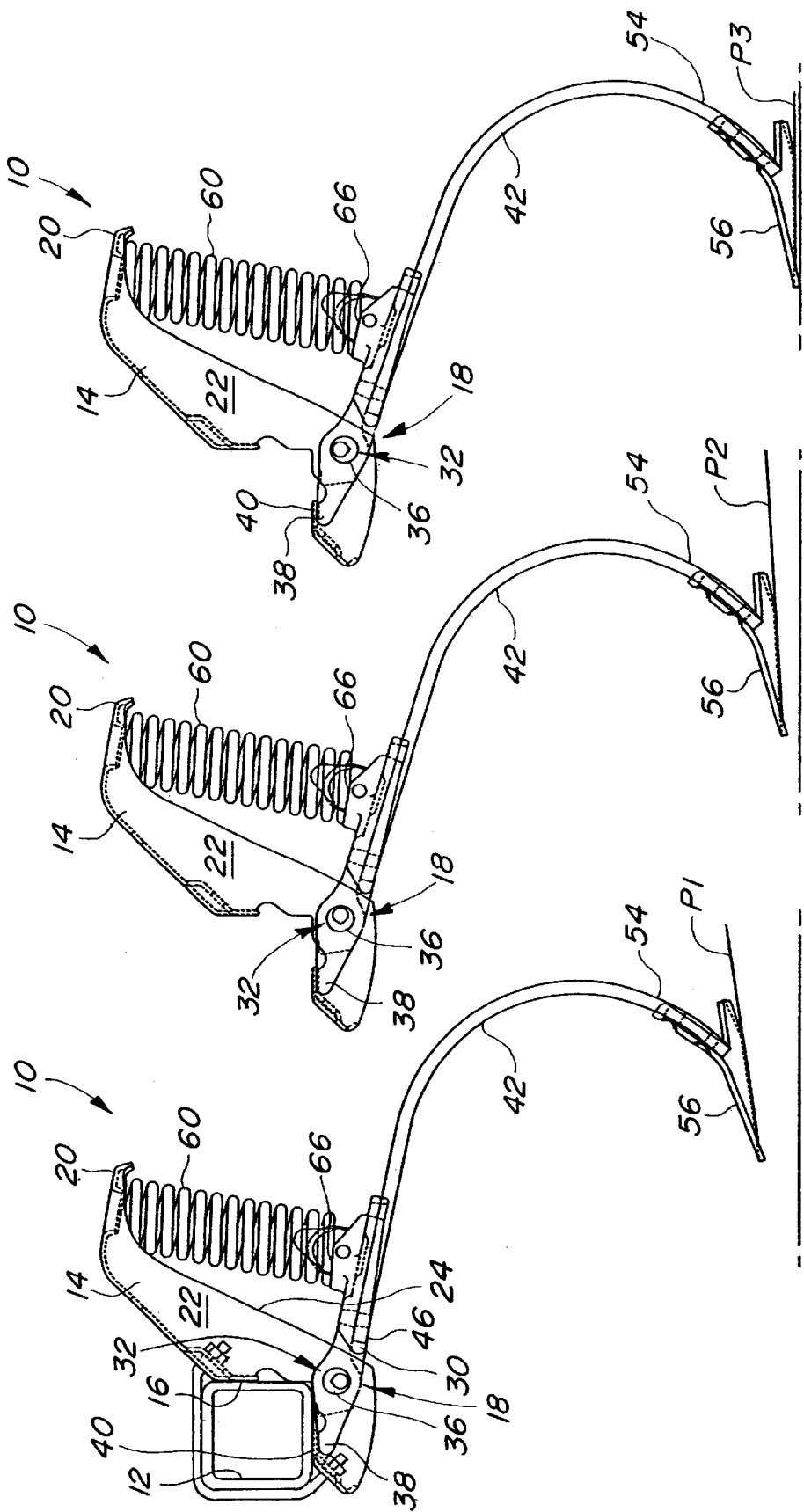

PITCH ADJUSTMENT FOR A TILLAGE SHANK ASSEMBLY

FIELD OF THE INVENTION

The present invention relates generally to agricultural implements and, more specifically, to a spring trip standard for tillage implements.

BACKGROUND OF THE INVENTION

Spring trip standards typically include a mounting bracket attached to a rectangular toolbar and extending upwardly and rearwardly to a downwardly and forwardly directed spring abutment surface. A spring is compressed between the abutment surface and an upwardly directed spring abutment surface on a member pivotally connected to the lower portion of the bracket, and a tool supporting shank is fixed to the member. A tension link assembly extends from the shank supporting member through the spring and through an aperture in the spring abutment surface on the bracket to adjust the preloading of the spring and vary the vertical position of the tool connected to the shank. Such an assembly is shown by way of example in U.S. Pat. No. 3,700,039 entitled SPRING TRIP SHANK ASSEMBLY. This type of shank assembly provides good trip force characteristics but has numerous parts and is expensive and time-consuming to assemble and repair. Previously available assemblies, particularly those with numerous tension link or spring support components such as pins, straps, spacers and washers, typically require extensive instructions for assembly and disassembly.

In some shank assemblies, the tension link reduces forces on the pivot area in the at rest position, thereby introducing some looseness in the pivot joints which often is perceived as a quality disadvantage and which causes the tool to have some lateral shift during operation. Often the precompression of the spring when the tool is in the normal operating position is not sufficient to prevent some continual tripping action.

In commonly assigned U.S. Pat. No. 6,250,398 entitled SPRING TRIP STANDARD, a spring trip arrangement is described which does not require a tension link. In commonly assigned U.S. Pat. No. 6,065,548 entitled SPRING TRIP STANDARD HAVING REDUCED SPRING BUCKLING FORCES, spring seat structure is described for providing generally perpendicular alignment of the lowermost coil of the spring relative to the centerline of the coil spring in both the field-working and the tripped positions so that spring buckling and spring fatigue caused by buckling are reduced. Upstop limit for the shank is provided by the spring when the spring coils stack against each other. To prevent spring coils from slipping past one another and causing permanent spring deformation, a spring stop arrangement described in commonly assigned U.S. Pat. No. 6,250,397 is provided. The stop arrangement also includes a downstop limit which establishes the lowermost field-working position of the shank and pitch of the tool mounted on the shank. Although the above-described arrangement reduces cost and increases reliability compared to at least most previously available spring trip shank assemblies, the lowermost position of the shank and pitch of the tool cannot be easily adjusted. Therefore, setting up the shanks for proper depth and tool angle has been a continuing problem with the assemblies that do not have a tension link to adjust the lowermost position of the shank. The ability to make quick and accurate adjustments of a plurality of such assemblies across the width of an implement has heretofore been unavailable.

SUMMARY OF THE INVENTION

It is therefore an object of the present invention to provide an improved spring trip assembly for an implement. It is a further object to provide such an assembly which overcomes most or all of the aforementioned problems.

It is a further object of the present invention to provide an improved spring trip assembly which has fewer parts and is lower in cost than most previously available shank assemblies and yet which facilitates shank adjustment. It is another object to provide such an assembly wherein tool pitch can be quickly and easily adjusted. It is still another object to provide such an assembly which is simple and inexpensive in design and manufacture and which does not require a tension link.

It is still another object of the invention to provide an improved spring trip shank assembly having a positive downstop independent of any tension link but yet which has an adjustable lowermost position. It is another object to provide such an assembly which is adjustable and wherein a plurality of the assemblies can be quickly and easily adjusted relative to each other. It is yet another object to provide such an assembly including a visual indicator for determining shank settings.

It is a further object of the present invention to provide a spring trip shank assembly which is simple and inexpensive in construction and which includes an eccentric mechanism strategically located to allow an operator to quickly and easily select from a variety of tool pitch positions. It is a further object to provide such an assembly which allows accurate adjustment of a plurality of assemblies across the width of an implement. It is still another object to provide such an assembly which includes a spring assembly without a tension link and which facilitates construction of the assembly with a one-piece shank support which includes a pivot area and fixed stop structure.

A spring trip standard for a tillage implement includes a coil spring compressed between an upper spring-abutting surface on the mounting bracket and a lower spring abutment surface on a casting which is connected by a transverse pivot to the mounting bracket. A tool-supporting shank is connected to the casting and biased downwardly into a ground working position by the spring. The casting includes a first integral stop extending forwardly from the pivot. The stop contacts the bottom of the bracket when the shank is in the ground working position so that a tension link between the bracket and casting is eliminated. The standard also includes a second stop to limit upward pivoting to a maximum tripped position wherein the spring is in or approaches a fully compressed condition but is not forced into an overly compressed condition wherein spring deformation occurs. Both the downstop and upstop functions are provided by a single casting.

To provide shank and tool pitch adjustment for the fixed downstop structure, the shank pivot area includes an eccentric mechanism with calibrated pitch positions for varying the location of the shank pivot relative to the downstop. The mechanism for varying pivot location includes a bushing with an eccentric bore inserted though the shank pivot area. A keyway in the bushing receives a threaded bolt with a mating key. The eccentric bore is aligned with holes in the standard mounting bracket, and the bolt and key are inserted through the bracket holes and the bore. A captive nut fastens the mechanism in position between the sides of the mounting bracket for the desired shank pitch. Multiple holes or elongated slots in the mounting bracket sides are not required for making the changes in shank pivot location.

To change pitch position, the nut is loosened and a wrench is positioned on the bolt to rotate the bolt and the bushing and thereby change the shank pivot location relative to the downstop. When the desired pitch is achieved, the nut is retightened. Incremental marks located on the mounting bracket and a notch on the bolt head which can be aligned with a selected one of the marks provide an easily readable indication of the selected pivot location so a plurality of the assemblies can be adjusted to the same pitch quickly and easily. The assembly is also inexpensive and simple in design and overcomes problems of adjusting a shank assembly with a fixed downstop.

A one-piece shank support structure which includes a pivot area and fixed stop may be used for reducing the number of parts and for ease of assembly while still retaining the pitch adjustment feature. The stop can contact a solid portion of the mounting bracket or implement frame adjacent the bracket since there is no need for an intermediate member to change downstop location. Adjustment structure that otherwise would be necessary and subject to looseness and wear at a high impact stop location is avoided.

These and other objects, features and advantages of the present invention will become apparent to one skilled in the art upon reading the following detailed description in view of the drawings.

BRIEF DESCRIPTION OF THE DRAWINGS

FIG. 1 is a side view of a spring trip shank assembly with a fixed downstop and showing a pitch adjustment mechanism for adjusting shank position, the bushing mounting bolt removed to better show the eccentric arrangement.

FIG. 2 is a view similar to FIG. 1 but showing the pitch adjustment mechanism in an intermediate position.

FIG. 3 is a view similar to FIG. 1 but showing the pitch adjustment mechanism in an adjusted position opposite that in FIG. 1.

DESCRIPTION OF THE PREFERRED EMBODIMENT

Figure 4:
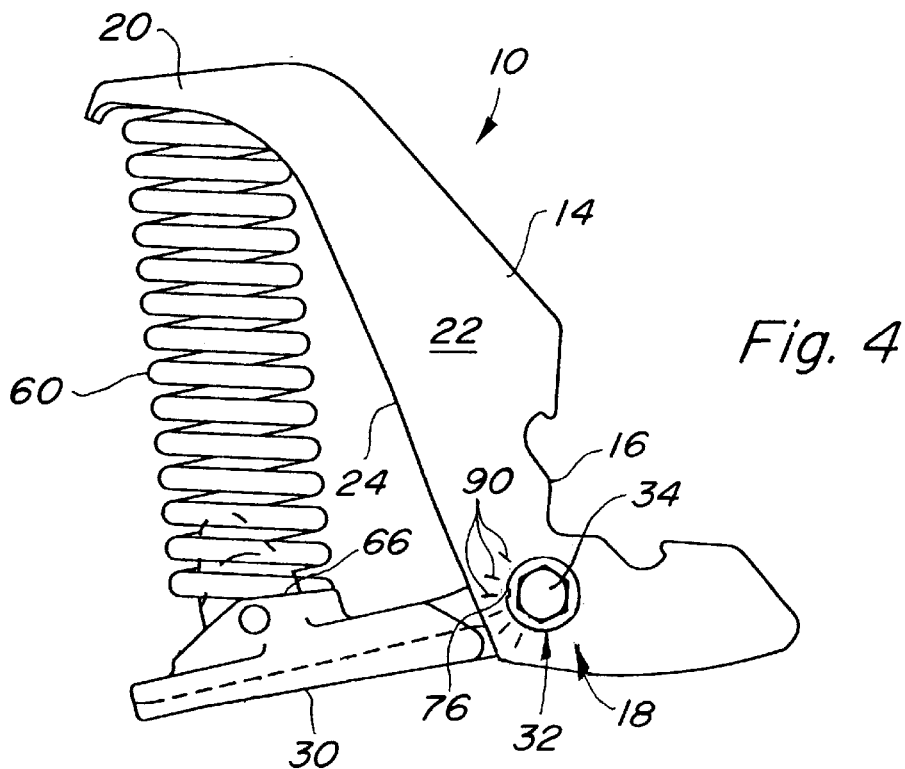
FIG. 4 is a view of a portion of the spring trip shank assembly of FIG. 2, viewed from the opposite side, illustrating the incremental marks and bolt head for providing a visual indication of pitch adjustment.

Referring now to FIG. 1, therein is shown a spring trip standard assembly 10 connected to a transversely extending implement frame member or toolbar 12 of rectangular cross section. The assembly 10 includes a rearwardly opening, channel-shaped bracket 14 having a forward mounting portion 16, a lower rear pivot area 18 and an upper spring-abutting surface 20 located rearwardly and above the pivot area 18. The bracket 14 includes upright side portions 22 terminating in rear upright edges 24 which extend between the pivot area 18 and the surface 20. The standard 10, with the exception of the pivot area 18, may be generally of the type shown and described in the aforementioned U.S. Pat. Nos. 6,250,398; 6,250,397 and 6,065,548. It is to be understood that the adjustment feature of the present invention may be utilized with other types of shanks.

Figure 7:
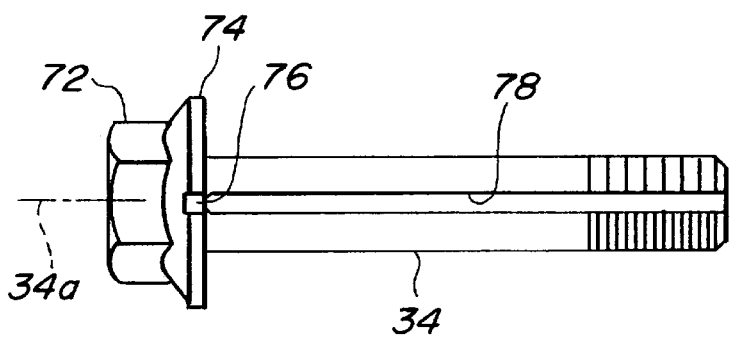
FIG. 7 is a view of the securing bolt for the pitch adjustment.
Figure 8:
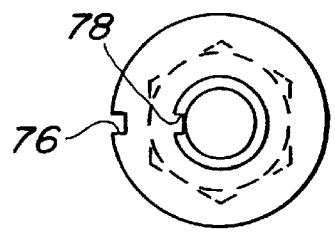
FIG. 8 is an end view of the bolt of FIG. 7.

A shank support casting 30 is pivotally connected to the rear pivot area 18 by an adjustable bushing assembly 32 including a bushing mounting flange bolt 34 (see FIGS. 4 and 7) and a cylindrical bushing 36 having an axis 36a. The bushing 36 includes an eccentric bore 37 with a bore axis 37a offset from the cylinder axis 36a. The mounting bolt 34 secures the bushing 36 relative to the bracket 14 between the side portions 22. The assembly 32 defines a shank pivot having an axis dependent upon the rotated position of the bushing 36.

The shank support casting 30 includes a fore-and-aft extension 38 projecting forwardly from the bore 37 under a solid downstop area indicated generally at 40 to limit downward pivoting (clockwise as viewed in FIGS. 1–3) to establish a preselected field-working position as shown by the solid lines in FIG. 1. Alternatively, the downstop area 40 may be the lower surface of the toolbar 12 or similar fixed location. The extension 38 has a width approximately equal to but slightly less than the spacing between the side portions 22.

A C-shaped shank 42 includes an apertured upper end 46 secured to the casting 30 by suitable means such as a bolt or clevis connection. The shank 42 curves downwardly and forwardly from the end 46 to a lowermost tool-receiving end 54 supporting an earthworking tool or shovel 56.

A coil spring 60 is freely compressed between the upper spring-abutting surface 20 and a lower spring-abutting surface 66 on the casting 30 independently of any tension link or spring guide structure within the coils of the spring. The spring 60 is precompressed to provide the spring trip force that a tillage spring trip standard is rated at in the field-working position with the downstop 40 bottomed out as shown in FIGS. 1–3. The precompression of the spring 60 in combination with the action of the fixed downstop arrangement loads the pivot to prevent looseness in the pivot area 18. The spring-abutting surface 66 includes a first spring-receiving portion which is generally parallel to the upper spring-abutting surface 20 and supports the lowermost coil when the shank 42 is in the field-working position and a second spring-receiving portion or surface 68 which is generally parallel to the surface 20 and supports the lowermost coil when the shank approaches the uppermost tripped position.

Figure 5:
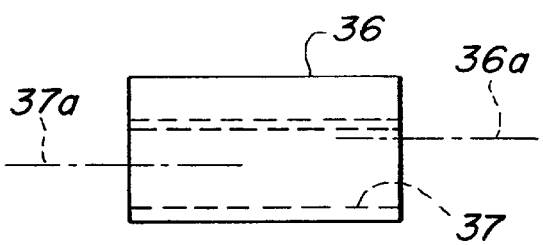
FIG. 5 is a side view of the pitch adjustment bushing with eccentric bore.
Figure 6:
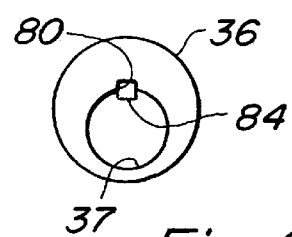
FIG. 6 is an end view of the bushing of FIG. 4.

The adjustable bushing assembly 32 provides shank position and tool pitch adjustment which is best illustrated by reference to FIGS. 1–3. The bushing mounting bolt 34 (see FIGS. 4 and 7) includes a headed end 72 with a flange 74 having a locator notch 76. A keyway 78 extends axially along the bolt shank from the notch 76 to the threaded end. A mating keyway 80 is provided in the bushing 36 at the inwardmost portion of the bore 37 (FIGS. 5 and 6). The bore 37 is aligned with circular mounting holes in the bracket sides 22, and the bolt 34 is inserted. A key 84 is also inserted in the keyways 78 and 80 to constrain the bolt 34 and the bushing 36 for rotation in unison about a generally fixed bolt axis. A conventional captive nut (not shown) is threaded onto the threaded end of the bolt 34. The mounting bolt 34, when tightened, nonrotatably secures the bushing 36 between the sides 22 of the bracket 14 to define a shank pivot having an axis dependent upon the rotated position of the bushing 36.

Indicator marks 90 (FIG. 4) on the side 22 of the bracket 14 cooperate with the locator notch 76 in the bolt flange 74 to provide an indication of the pivot setting and thus the pitch (see P2 of FIG. 2) of the tool 56. By loosening the captive nut and rotating the bolt and bushing about the fixed bolt axis (34a), the pivot location is changed relative to the downstop area 40 so that the shank position and tool pitch change. The operator can quickly adjust adjacent shank assemblies 10 to the same general setting by adjusting the mounting bolts so the locator notches 76 are in the same positions relative to the indicator marks.

In operation, assuming the adjustable bushing assembly is in an intermediate position as exemplified in FIGS. 2 and 4, the operator can increase the pitch of the tool 54 (FIG. 1) by loosening the captive nut on the bolt 34 and rotating the bolt 34 with the bushing 36 so that the bore 37 moves downwardly relative to the downstop. This action raises the effective shank pivot location causing the tool end 54 of the shank 42 to lift and increasing the pitch (P1) of the tool. If the operator desires to lower the tool end 54 and thereby decrease the pitch (see P3 of FIG. 3), the bolt 34 is loosened and the bolt is rotated to lower the effective pivot axis of the shank 42. Once the desired shank setting is achieved, the operator simply tightens the bolt 34. Therefore, shank and tool pitch adjustments can be made quickly, easily and predictably in a shank assembly without having to change downstop location.

Having described the preferred embodiment, it will become apparent that various modifications can be made without departing from the scope of the invention as defined in the accompanying claims.

We claim:

1. A spring trip shank assembly adapted for movement in a forward direction over the ground, the shank assembly comprising a support bracket, a shank having an upper attaching end and a lower tool mounting end for supporting an earthworking tool, pivot structure connecting the attaching end of the shank to the support bracket for pivoting about a shank axis extending generally transverse to the forward direction, spring structure for urging the tool mounting end downwardly towards the ground, a downstop limiting downward pivoting of the lower tool mounting end to a lowered working position, and wherein the pivot structure includes adjustment structure for changing the shank axis relative to the downstop to adjust the lowered working position of the tool mounting end without need for adjustment of the downstop, wherein the pivot structure includes a projection extending radially from the axis into the contact with the downstop as the tool moves to the lowermost position.

2. A spring trip shank assembly adapted for movement in a forward direction over the ground, the shank assembly comprising a support bracket, a shank having an upper attaching end and a lower tool mounting end for supporting an earthworking tool, pivot structure connecting the attaching end of the shank to the support bracket for pivoting about a shank axis extending generally transverse to the forward direction, spring structure for urging the tool mounting end downwardly towards the ground, a downstop limiting downward pivoting of the lower tool mounting end to a lowered working position, and wherein the pivot structure includes adjustment structure for changing the shank axis relative to the downstop to adjust the lowered working position of the tool mounting end without need for adjustment of the downstop, wherein the pivot structure includes a casting having a circular bore and an integral downstop-contacting projection extending radially from the bore.

3. A spring trip shank assembly adapted for movement in a forward direction over the ground, the shank assembly comprising a support bracket, a shank having an upper attaching end and a lower tool mounting end for supporting an earthworking tool, pivot structure connecting the attaching end of the shank to the support bracket for pivoting about a shank axis extending generally transverse to the forward direction, spring structure for urging the tool mounting end downwardly towards the ground, a downstop limiting downward pivoting of the lower tool mounting end to a lowered working position, and wherein the pivot structure includes adjustment structure for changing the shank axis relative to the downstop to adjust the lowered working position of the tool mounting end without need for adjustment of the downstop, wherein the adjustment structure includes a rotatable bushing defining the shank axis, wherein the bushing has a rotational axis offset from the shank axis so that rotation of the bushing moves the shank axis.

4. The spring trip shank assembly as set forth in claim 3 including a fastening member securing the bushing in a selected rotated position and an indicator providing a visual indication of the selected rotated position.

5. The spring trip shank assembly as set forth in claim 3 including a bolt extending through the bushing and rotatably fixed to the bushing so that rotation of the bolt rotates the bushing.

6. The spring trip shank assembly as set forth in claim 5 wherein the bolt extends through the support bracket and is rotatable about a fixed bolt axis and includes an indicator providing an indication of the rotated position of the bushing.

7. A spring trip shank assembly adapted for movement in a forward direction over the ground, the shank assembly comprising a support bracket, shank structure having an upper attaching end and a lower tool mounting end for supporting an earthworking tool, pivot structure connecting the upper attaching end to the support bracket for pivoting about an axis extending generally transverse to the forward direction, spring structure for urging the tool mounting end downwardly towards the ground about the axis, a stop offset from the axis at a generally fixed location relative to the support bracket for limiting pivoting of the shank structure about the axis and establishing a stop position of the shank structure, wherein the pivot structure includes adjustment structure for changing the axis relative to the stop to adjust the stop position, and wherein the adjustment structure comprises a rotatable eccentric connected to the support bracket and defining the axis.

8. The spring trip shank assembly as set forth in claim 7 including a connecting member releasably securing the eccentric against rotation relative to the support bracket, the connecting member permitting selective rotation of the eccentric to adjust the stop position.

9. The spring trip shank assembly as set forth in claim 7 wherein the eccentric comprises a circular bushing having a central axis and a mounting bore having a bore axis offset from the central axis, and further including a connecting member extending through the bore and the support bracket, the eccentric rotatable about the bore axis.

10. A spring trip shank assembly adapted for movement in a forward direction over the ground, the shank assembly comprising a support bracket, shank structure having an upper attaching end and a lower tool mounting end for supporting an earthworking tool, pivot structure connecting the upper attaching end to the support bracket for pivoting about an axis extending generally transverse to the forward direction, spring structure for urging the tool mounting end downwardly towards the ground about the axis, a stop offset from the axis at a generally fixed location relative to the support bracket for limiting pivoting of the shank structure about the axis and establishing a stop position of the shank structure, wherein the pivot structure includes adjustment structure for changing the axis relative to the stop to adjust the stop position, and wherein the support bracket includes side portions and the adjustment structure is releasably secured to the side portions.

11. A spring trip shank assembly adapted for movement in a forward direction over the ground, the shank assembly comprising a support bracket, shank structure having an upper attaching end and a lower tool mounting end for supporting an earthworking tool, pivot structure connecting the upper attaching end to the support bracket for pivoting about an axis extending generally transverse to the forward direction, spring structure for urging the tool mounting end downwardly towards the ground about the axis, a stop offset from the axis at a generally fixed location relative to the support bracket for limiting pivoting of the shank structure about the axis and establishing a stop position of the shank structure, wherein the pivot structure includes adjustment structure for changing the axis relative to the stop to adjust the stop position, and wherein the pivot structure includes a stop portion extending radially from the axis for rotation with the shank in a path and wherein the support bracket defines the stop at a fixed location within the path.

12. An adjustable pivot for an agricultural shank, assembly having a shank supported for pivoting on a mounting bracket and a downstop for establishing a shank position, the adjustable pivot including:

a cylindrical shank supporting bushing having a bushing axis, the bushing including a mounting bore having a bore axis offset from the bushing axis;

a fastener received by the mounting bore and adapted for connecting the bushing to the mounting bracket; and constraining structure connected between the bushing and the fastener and constraining the bushing and fastener for rotation together so that by rotating the fastener the bushing axis will change to thereby change the effective pivot location of the shank supported by the bushing.

13. The adjustable pivot as set forth in claim 12 wherein the fastener includes a mounting bolt, and wherein the constraining structure includes a key located in a keyway in the mounting bolt.

14. The adjustable pivot as set forth in claim 12 wherein the fastener includes a headed member inserted through the mounting bore, the headed member including an indicator providing a visual indication of the rotated position of the fastener for determining the adjusted position of the pivot.

* * * * *